Patented June 10, 1952

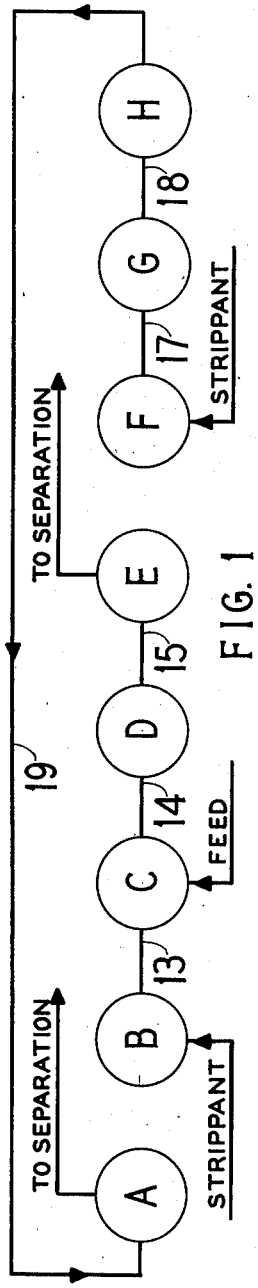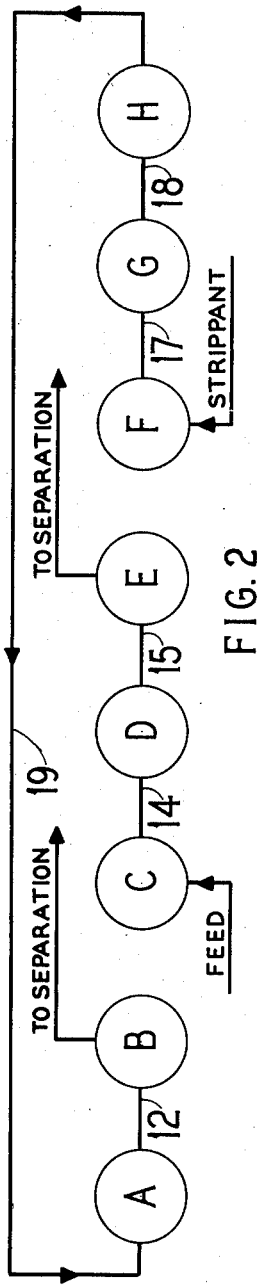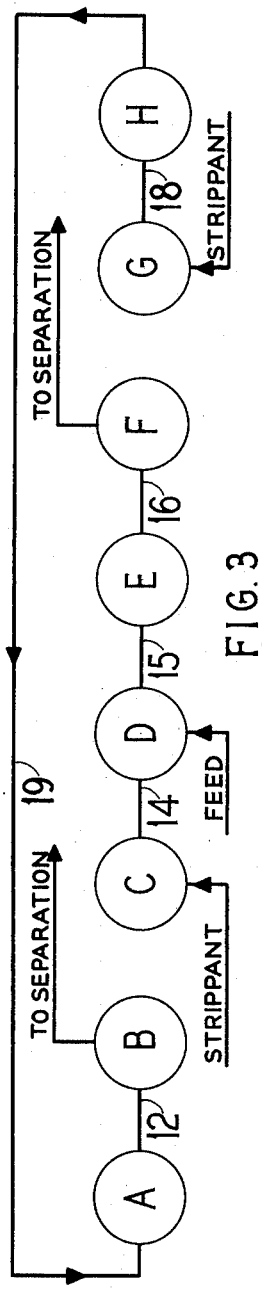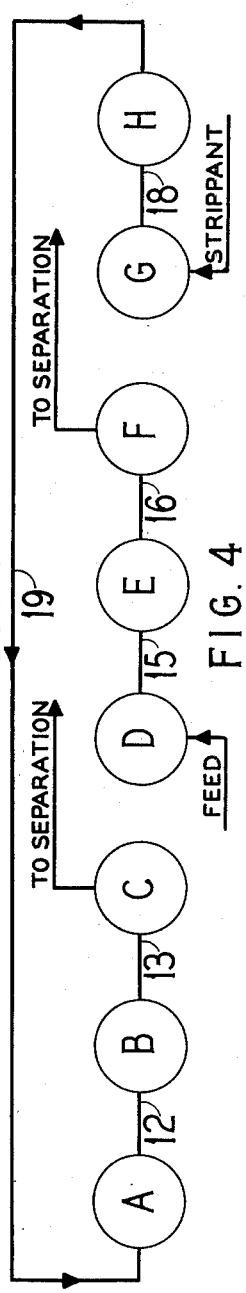

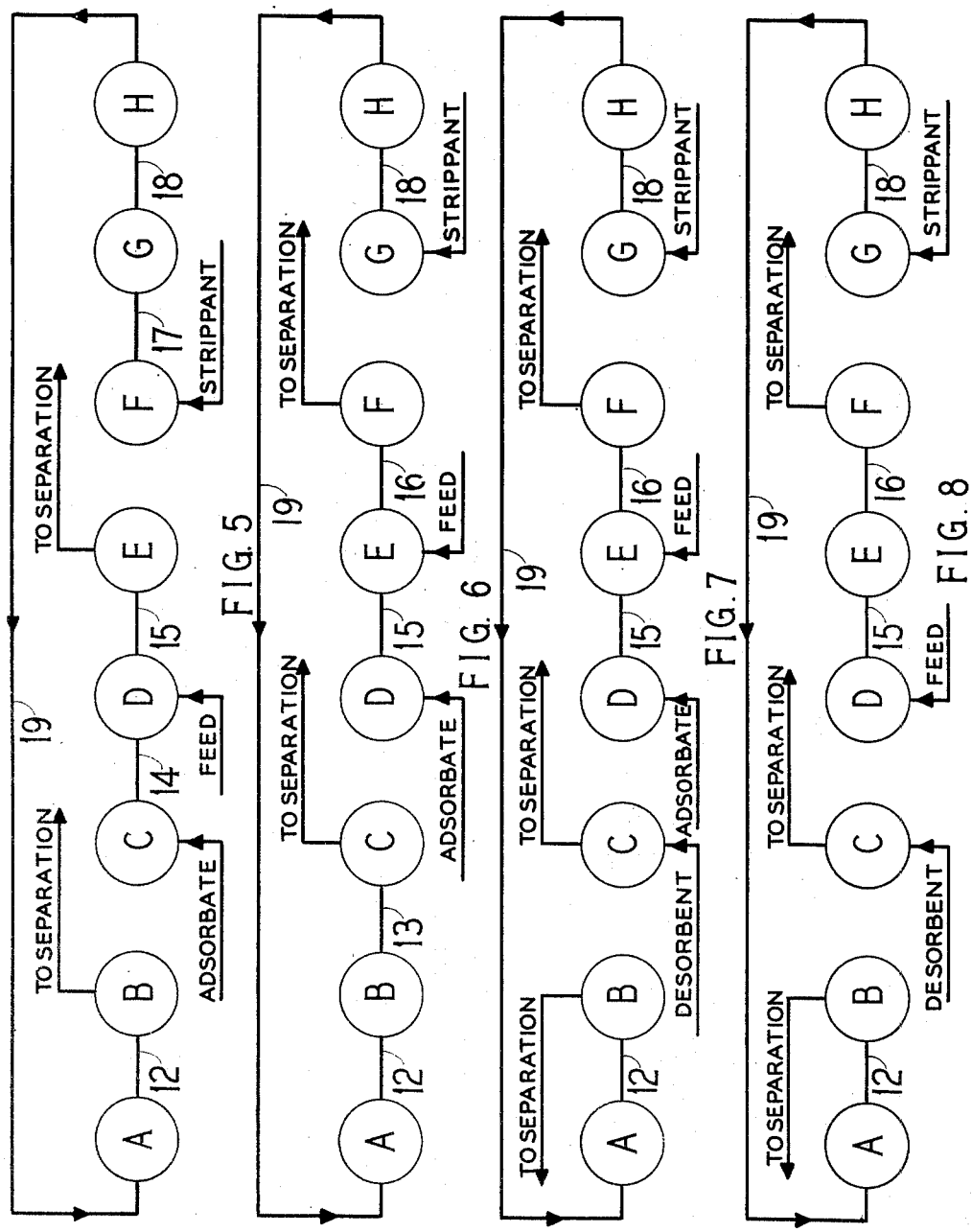

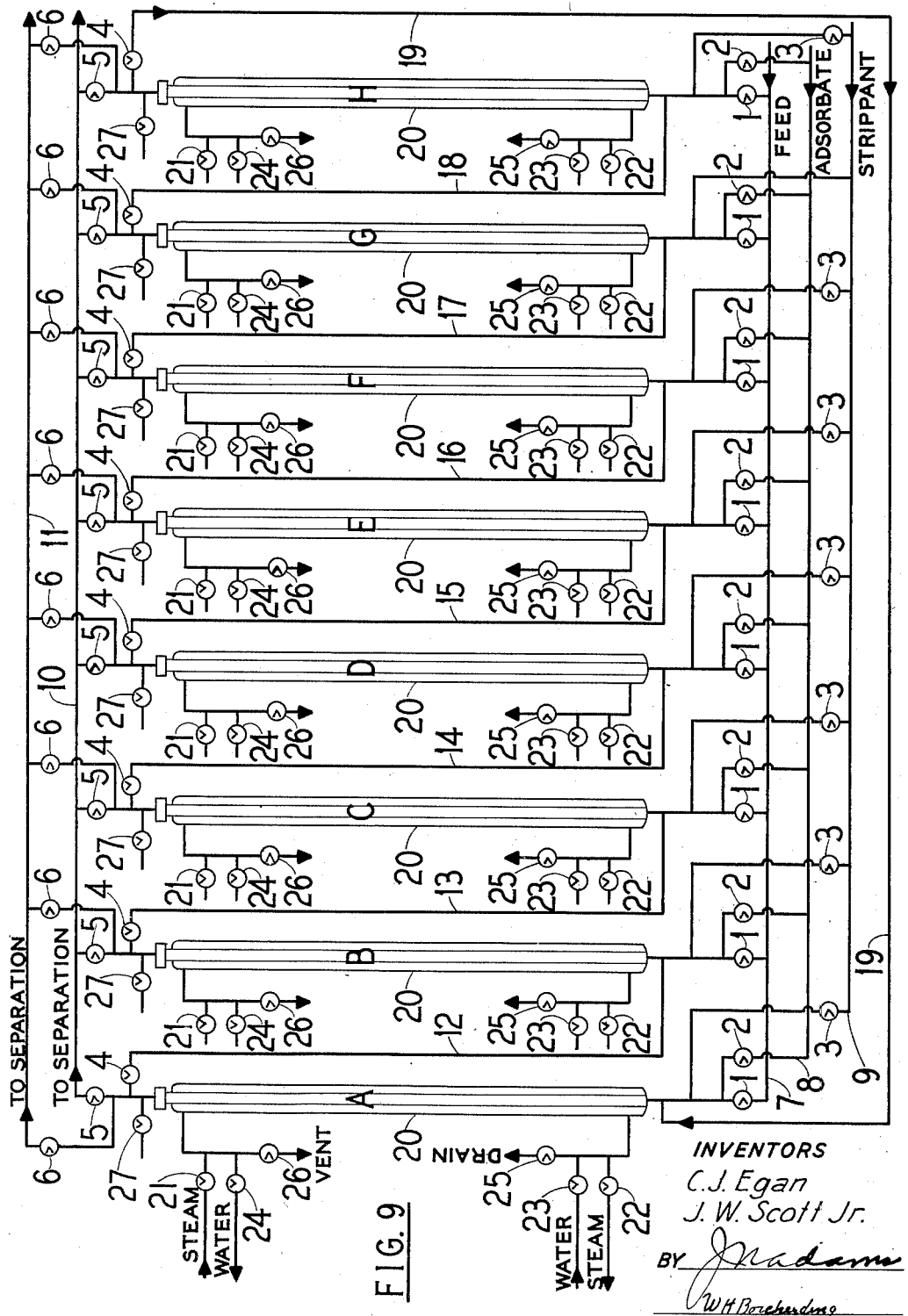

2,599,545

UNITED STATES PATENT OFFICE 2,599,545

CYCLIC ADSORPTION PROCESS

Clark J. Egan, Piedmont, and John W. Scott, Berkeley, Calif., assignors to California Research Corporation, San Francisco, Calif., a corporation of Delaware Application December 26, 1947, Serial No. 793,772

22 Claims. (Cl. 196—147)

The present invention relates to a process for the separation of liquid mixtures which are amenable to separation by preferential adsorption on a solid adsorbent wherein both the adsorbed and non-adsorbed fractions of the feed liquid are recovered and the adsorbent is regenerated for re-use, and more particularly to a process for the separation of petroleum hydrocarbons by the preferential adsorptive action of a solid adsorbent.

The phenomenon of liquid phase preferential adsorption has been described as a tendency for a solute to change its concentration in a surface film of a solution whenever a change in the surface tension of the solution is effected thereby. The presence and extent of the phenomenon can be determined for any given mixture by bringing the mixture into contact with an adsorbent which in normal usage is a solid with a large amount of available surface. For example, the introduction of an adsorbent such as silica gel or activated alumina into a mixture of toluene and isooctane will result in a decrease in the concentration of toluene in the solution. The material adsorbed is a mixture of toluene and isooctane in which the toluene concentration is higher than it was in the original solution. Toluene is therefore said to be preferentially adsorbed from the toluene-isooctane solution. Similarly, it is found that, in the treatment of a variety of liquid mixtures with a variety of solid adsorbents, the adsorbents commonly show an adsorptive preference for one or more of the components of the mixture.

In the interest of brevity and clarity in the following description and discussion, the following designations of the liquids used in, and produced by, the adsorption process are adopted:

The liquid undergoing separation will be referred to as the liquid feed.

The preferentially adsorbable fraction of the feed removed from the adsorbent as a product of the process will be referred to as the "adsorbate."

The residual non-preferentially adsorbable fraction of the feed recovered as a product of the process will be referred to as the "percolate."

A liquid used to remove the adsorbate from the absorbent will be referred to as a "desorbing liquid" or "desorbent" if it is a liquid for which the adsorbent shows a greater adsorptive preference than that shown for the adsorbate.

A liquid used to remove the adsorbate from the absorbent will be referred to as a "stripping liquid" or "strippant" if it is a liquid for which the adsorbent shows a lower adsorptive preference than that shown for the adsorbate.

Recognition of the fact that adsorbents commonly show an adsorptive preference for one or more components of mixtures with which they may be brought into contact, indicated the feasibility of employing an adsorption process to effect separations which could not readily be made by the usual methods of distillation, crystallization, and the like, and numerous commercial separations by adsorption were developed. In the earlier developments, as in the Gray Process, the adsorption was directed to the removal of impurities present in low concentration, and no attempt was made to recover the adsorbed material. In other of the earlier processes no attempt was made to reactivate the spent adsorbent. More recently, vapor phase separations by adsorption have been effected wherein both the adsorbed and non-adsorbed substances have been recovered. About ten years ago the National Bureau of Standards developed an analytical procedure based on liquid phase adsorption wherein both the adsorbed and non-adsorbed substances were recovered.

The difficulty of developing an economically feasible method of desorbing the adsorbate and reactivating the adsorbent for re-use has been a persistent obstacle in the path of commercial success in a large-scale liquid phase adsorption separation process. In the past, the adsorbent has been reactivated by treatment with superheated steam or hot gas, or by treatment with a very strongly adsorbed desorbent followed by steam or hot gas reactivation. Such a method, involving the heating and cooling of adsorbent materials which are characteristically poor heat conductors through large temperature intervals, presents an obvious disadvantage in a large-scale operation.

It is well known that adsorption is an equilibrium process of the dynamic and reversible type. When a feed mixture is brought into contact with a solid adsorbent, this type of equilibrium is realized after the lapse of a definite period of time and, upon such realization, no further change occurs in the relative concentrations of the components of the adsorbed and non-adsorbed fractions of the feed mixture. All of the components of the mixture are being continuously adsorbed and desorbed, but at equilibrium the rates of adsorption and desorption are equal for each component, hence, no net change in relative concentration is produced. A net change in relative concentration may, however, be intentionally produced by changing one or more of the conditions under which the state of equilibrium exists in the particular system. For example, if the feed mixture in contact with the adsorbent is replaced by a feed mixture which is richer in the preferentially adsorbed component, further net adsorption of this component will occur. Contrariwise, if the feed mixture in contact with the adsorbent is replaced by a feed mixture in which the preferentially adsorbed component is present in lower concentration, net desorption of this component will occur. If the feed mixture in contact with the adsorbent is replaced by a liquid composed entirely of material for which the adsorbent shows a lower adsorptive preference than that shown for the preferentially adsorbed fraction of the feed mixture, such liquid will tend to remove the preferentially adsorbed fraction of the feed mixture from the adsorbent and to regenerate the absorbent for reuse. To effect a substantial desorption and regeneration in this manner, however, will require circulation over the adsorbent of a relatively large volume of non-preferentially adsorbed liquid and the consequent introduction of the secondary recovery problem of separating from this liquid the desorbed component.

Difficulty is encountered in achieving economic secondary recovery because of the large volume of non-preferentially adsorbed stripping liquid which must be used to effect desorption regeneration, especially if a batch type operation be employed, with the result that a large volume of the stripping liquid, together with the material which it has removed from the absorbent, must be distilled or otherwise separated. Any adaptation of this principle of adsorbent regeneration in which the volume of liquid required to be treated in secondary recovery operations is substantially reduced would provide an economically attractive alternative to the heat regeneration methods of the past.

The processes for effecting separation by preferential adsorption which have been proposed in the past are of two types, batch operations employing a fixed adsorbent bed, and continuous operations in which the solid adsorbent is moved through the separatory system.

The continuous adsorption processes which have been suggested are of the moving adsorbent bed type and require the use of adsorbent particles sufficiently large to permit fall countercurrent to the upflow of feed mixture in the adsorption zone. Mechanical means are used to transport the adsorbent from the adsorption zone to regeneration and back to the adsorption zone for recirculation. The use of large adsorbent particles presents two serious disadvantages. First, the rate of attainment of equilibrium varies inversely with a power of the particle size, consequently, substantial disadvantage in respect to the rate of attainment of equilibrium attends the use of large particles. Second, many adsorbents show progressive fining in a series of adsorption-desorption cycles and this is aggravated by mechanical handling of the particles. These fines must be removed and replaced by large particles in order to maintain an operable average particle size. The fining of the adsorbent frequently increases with particle size, hence, moving bed operations which are limited to the larger particles for the reasons discussed above are at a further disadvantage. Such a continuous adsorption process, however, has the advantage of continuity of operation and of countercurrent flow.

Batch operations which have been suggested are of the fixed adsorbent bed type in which the feed is first caused to flow through the adsorbent bed, then its flow is interrupted and a stripping medium is caused to flow through the bed. Operation is not countercurrent and the usual disadvantages of batch operations generally apply to such adsorption processes. However, the fact that the batch operation employs a fixed adsorbent bed makes possible the use of adsorbent particles much smaller than those which would be operable in the continuous operation described. For example, the particles employed in the batch process may well be only one-tenth the size of those required in the continuous process, which means that the diffusion rate and the rate at which equilibrium is reached in the batch process will be approximately one hundred times the rate for the continuous process. This is a substantial advantage.

It is an object of this invention to provide a commercially practicable process for the separation of liquid mixtures amenable to separation by preferential adsorption by a substantially continuous liquid phase preferential adsorption process wherein the difficulties which attend the employment of a moving mass of adsorbent particles are avoided and in which the adsorbent particles employed may be substantially smaller than those employed in a continuous process utilizing a moving adsorbent bed.

It is a further object of this invention to provide a method for the recovery of the adsorbate, and reactivation of the adsorbent wherein the inventory of adsorbent required, and the volume of material to be treated in secondary recovery processes, shall be substantially smaller than that which would be required if batch operations were employed.

Referring to the appended drawings:

Figure 1 is a diagrammatic representation of the flow pattern in the first part of a cycle of operation in the process of this invention.

Figure 2 represents the flow pattern in the latter part of the cycle of operation begun as shown in Figure 1.

Figure 3 represents the flow pattern in the first part of the cycle of operation next following the cycle illustrated by Figures 1 and 2.

Figure 4 represents the flow pattern in the second part of the cycle next following the cycle of operation illustrated by Figures 1 and 2.

Figures 5 and 6 diagrammatically represent the flow patterns employed in two successive cycles of modification of the process of this invention.

Figure 7 illustrates a cycle of operation in a further modification of the process of this invention.

Figure 8 illustrates the flow pattern in a cycle of operation in a further modification of the process of this invention.

Figure 9 is a more detailed diagram of an arrangement of apparatus for the practice of the process of this invention.

For the purpose of disclosing the general operation of the process of this invention reference is made to Figure 1 of the appended drawings. Each of the letters A to H, inclusive, indicates an adsorption column filled with a mass of solid adsorbent particles. A liquid feed mixture is introduced into the system and separated into an adsorbate and a percolate. The adsorbate is removed from the adsorbent and the adsorbent is concurrently regenerated for re-use by introduction into the system of a stripping liquid, that is, as above defined, a liquid for which the adsorbent shows a lower adsorptive preference than that shown for the adsorbate. Substantial continuity of operation is achieved by moving the points of liquid introduction and withdrawal in successive cycles of operation. Let it be assumed that the $n-1$ cycle of operation has just been completed and that the $n$th cycle is about to begin, Figure 1 representing the flow pattern at the beginning of the $n$th cycle.

Under the assumed condition at the close of the $n-1$ cycle and at the beginning of the $n$th cycle of operation, the interstitial space between the adsorbent particles in column B is filled with unchanged feed mixture and the adsorbent in column B holds adsorbate to the extent that equilibrium has been established and this adsorbent is incapable of effecting any further separation of the feed mixture under the conditions of operation. Thus, the adsorbent in column B at this stage may be characterized as "spent" or "saturated" or "exhausted" for the purpose of the desired adsorption fractionation operation, and hence must be regenerated before further use. The interstitial space between the adsorbent particles in column C is filled with partially separated feed mixture and the adsorbent in column C holds some adsorbate but is capable of further adsorption before coming to equilibrium with unchanged feed mixture. The interstitial space in column D is also filled with partially separated feed mixture, and the adsorbent in column D has also adsorbed some adsorbate and is also capable of further adsorption before coming into equilibrium with unchanged feed mixture. The interstitial liquid in column D is more completely separated than that in column C, and the adsorbent in column D retains more capacity for further adsorption of the adsorbate than does that in column C. The interstitial space in column E is filled with a stripping liquid for which the adsorbent shows a lower adsorptive preference than that shown for the adsorbate. The adsorbent in column E has been substantially stripped of adsorbate which it previously held, and the liquid now held as an adsorbate by this adsorbent is substantially all stripping liquid. The interstitial spaces in columns F, G, H, and A contain mixtures of stripping liquid and stripped adsorbate which have been removed from the adsorbent. The concentration of the stripped adsorbate in the interstitial liquid in these several columns engaged in the stripping or regeneration stage increases progressively from F through A. The adsorbent in these columns has been partially stripped and regenerated and the degree of stripping and regeneration is successively less complete from F through A. The foregoing thus describes the conditions existing in each of the adsorbent columns A to H, inclusive, at the end of the $n-1$ cycle and at the start of the $n$th cycle, as shown in Figure 1.

To initiate the $n$th cycle of operation, as illustrated by Figure 1, liquid feed mixture is introduced into column C, stripping liquid is introduced in column F and also into column B. A mixture of stripping liquid and percolate is withdrawn from column E and a mixture of stripping liquid and stripped adsorbate is withdrawn from column A. Columns B, C, D, and E serially connected by lines 13, 14, and 15 constitute an adsorption zone, and columns F, G, H, and A serially connected by lines 17, 18, and 19 constitute a regeneration zone. Liquid introduction and withdrawal are continued as above described until stripping liquid appears in line 13. When this occurs, the direct introduction of stripping liquid into column B is discontinued and column B is disconnected from the adsorption zone and is connected to the regeneration zone by line 12 as shown in Figure 2 of the appended drawings. Column B thus becomes the last adsorption column of the regeneration zone, and the column from which the mixture of stripping liquid and stripped adsorbate is withdrawn.

The introduction and withdrawal of liquids is continued according to the flow pattern of Figure 2 until the capacity of the adsorbent in column C to effect the desired adsorption separation is exhausted, which condition is evidenced by the appearance of unchanged feed in line 14, and until the adsorbent in column F is substantially regenerated, which condition is evidenced by the appearance of substantially pure stripping liquid in line 17. Flow rates may be, and preferably are, so controlled that these two conditions are realized substantially simultaneously. Upon such realization, the $n+1$ cycle of operation is initiated by moving all liquid introduction and withdrawal points in the several columns in the first part of the $n$th cycle, shown in Figure 1, to the next serially connected column in the direction of flow and changing the serial connections between the columns to those indicated in Figure 3. The resultant flow pattern at the beginning of the $n+1$ cycle is illustrated by Figure 3, and the flow pattern in the latter part of the $n+1$ cycle of operation is illustrated by Figure 4 of the appended drawings.

In Figure 1, stripping liquid is introduced into column B to sweep the resident unchanged feed liquid from column B into the effective adsorption zone of the cycle before the stripping of the adsorbent in column B is begun. As soon as the unchanged feed liquid in column B is removed, the flow pattern of Figure 2 is followed. The completion of the first part of the $n$th cycle following the flow pattern of Figure 1 may be determined by the appearance of stripping liquid in line 13, as indicated above, or by the introduction into column B of a predetermined volume of stripping liquid, which volume is slightly in excess of the volume of the interstitial space in the column.

Figure 2 illustrates the process flow during the latter part of the $n$th cycle of operation and, similarly, Figure 4 illustrates the flow during the latter part of the $n+1$ cycle. In Figure 2 the feed is introduced into a liquid inlet situated in column C, the first terminal adsorbent mass of the adsorption zone and the percolate is withdrawn at a liquid outlet situated in column E, the last terminal mass of the adsorption zone; and, during the flow of feed through the adsorption zone, a concentration gradient of the preferentially adsorbable fraction of the feed held on the adsorbent is established. This concentration is greatest on the adsorbent in column C, the first terminal adsorbent mass of the zone (the column which is next to be transferred to the regeneration zone), and least on the adsorbent in column E, the last terminal mass of the zone and also the column most recently regenerated. Stripping liquid is introduced into a liquid inlet situated in column F, the first terminal adsorbent mass of the regeneration zone and effluent mixture of stripping liquid and adsorbate is recovered at a liquid outlet situated in column B, the last terminal mass of the regeneration zone. During the flow of the stripping liquid through the regeneration zone, it comes into contact successively with the adsorbent masses of columns F, G, H, A, and B, having a gradient concentration of adsorbate which increases progressively from F through B. The adsorbent in column B, having been most recently on stream in the $n-1$ cycle, contains adsorbate in higher concentration than the other adsorbent masses of the regeneration zone, which have each been in the regeneration zone during one or more cycles of operation, and have thus been partially regenerated. The words first and last are used above and hereafter in the sense that the flow of liquid in each zone is from the first to the last of the serially interconnected adsorbent masses thereof.

Referring now to Figure 4, which illustrates the flow pattern for the latter part of the $n+1$ cycle of operation, it is seen that the adsorbent masses have been regrouped to form the adsorption and regeneration zones of the $n+1$ cycle. Column C, the first adsorbent mass of the adsorption zone in the $n$th cycle, illustrated in Figure 2, becomes the last adsorbent mass of the regeneration zone in the $n+1$ cycle illustrated by Figure 4; and column F, the first adsorbent mass of the regeneration zone in the $n$th cycle, illustrated by Figure 2, is the last adsorbent mass of the adsorption zone in the $n+1$ cycle, illustrated by Figure 4. Following this regrouping, the flow pattern for the $n+1$ cycle illustrated by Figure 4 is completed by shifting the feed inlet from column C in Figure 2 to column D in Figure 4 and shifting the stripping liquid inlet from column F in Figure 2 to column G in Figure 4, that is, shifting each point of liquid introduction in each zone to the next serially connected adsorbent mass of the zone in the direction of flow to initiate the succeeding cycle. Thus, the changes in the interconnections of the adsorbent masses which are made at the completion of the $n$th cycle of operation illustrated by Figure 2 in order to obtain the flow pattern for the latter portion of the $n+1$ cycle of operation, illustrated by Figure 4, cause a relative motion of the adsorbent masses countercurrent to the direction of flow. For example, column H in Figure 4 is one adsorbent mass position closer to the stripping liquid inlet than it was in Figure 2; column E in Figure 4 is one adsorbent mass position closer to the feed inlet than it was in Figure 2.

If Figure 2 is considered to represent a first cycle of operation, it is seen that on the ninth cycle each of the adsorbent masses will have traversed both the adsorption and regeneration zones by relative countercurrent motion and will have returned to its relative position in the first cycle of Figure 2. In general, if there be X-adsorbent masses in the system, each adsorbent mass will undergo a relative countercurrent motion during successive cycles, and, by moving at a rate of one adsorbent mass position per cycle, will return during the $X+1$ cycle to its relative position in the first cycle.

Figure 5 of the appended drawings illustrates the flow pattern in a cycle of operation in a modification of the process above described. The modification consists in recycling a portion of previously separated adsorbate. Let it be assumed that the $n-1$ cycle of operation has just been completed and that the $n$th cycle is about to begin. Under this assumed condition the interstitial space between the adsorbent particles in column B is filled with previously recovered adsorbate which has been recycled to column B in order to effect a more complete separation of the percolate. The adsorbent in column B is saturated with adsorbate. The interstitial space in column C is filled with essentially unchanged feed mixture and the adsorbent in column C has taken up adsorbate in such amount that a substantial equilibrium exists between the feed mixture and the adsorbent surface. The interstitial space in column D is filled with partially separated feed and the adsorbent in column D is in dynamic equilibrium with its interstitial liquid, but will take up more adsorbate before coming into equilibrium with unchanged feed mixture. The interstitial space in column E is occupied by substantially pure stripping liquid and the adsorbent in column E has been substantially stripped of adsorbate and is ready for re-use. Columns F, G, H and A contain in their interstitial spaces a mixture of adsorbate and stripping liquid, the concentration of the adsorbate increasing progressively from F to A. The adsorbent in columns F, G, H, and A is, in each column, in dynamic equilibrium with its interstitial liquid; and in each column the adsorbent holds some adsorbate, the amount held increasing progressively from F to A.

The $n$th cycle of operation is initiated by serially connecting columns C, D, and E by lines 14 and 15 to constitute an adsorption zone, and columns F, G, H, A, and B by lines 17, 18, 19, and 12 to constitute a regeneration zone, recycling either previously separated adsorbate or the first effluent of column B to a liquid inlet situated in column C, the first terminal adsorbent mass of the adsorption zone, introducing feed into a liquid inlet situated in column D, an intermediate adsorbent mass of the adsorption zone, and recovering a mixture of percolate and stripping liquid at a liquid outlet situated in column E, the last terminal adsorbent mass of the adsorption zone. At the same time stripping liquid is introduced into an inlet situated in column F, the first terminal adsorbent mass of the regeneration zone and a mixture of stripping liquid and adsorbate is recovered at column B, the last adsorbent mass of the regeneration zone. The feed rates of the materials above indicated as entering columns C, D and F are so controlled that there will be a substantially simultaneous realization of the following conditions: Substantially pure adsorbate appears in line 14, or if the first effluent of column B is recycled to column C, at least half a column volume has been introduced; substantially unchanged feed appears in line 15, or the quantity of the preferentially adsorbable fraction of the feed contained in the percolate effluent from column E rises above the desired maximum, or both; and substantially pure stripping liquid appears in line 17. When these conditions are attained, the $n+1$ cycle of operation illustrated by Figure 6 is initiated.

Referring now to Figure 6, representing the operation of the $n+1$ cycle in this modification of the invention, columns D, E, and F are serially interconnected by lines 15 and 16, constituting the adsorption zone of this cycle. Columns G, H, A, B, and C are serially interconnected by lines 18, 19, 12 and 13, constituting the regeneration zone of this cycle. Adsorbate, or the first effluent of column C, is recycled to column D; feed is introduced to column E, and stripping liquid is introduced to column G. A mixture of adsorbate and stripping liquid is withdrawn from column C, and a mixture of percolate and stripping liquid is withdrawn from column F. The liquid introduction and withdrawal is continued so controlled that simultaneously substantially pure adsorbate appears in line 15, or if the first effluent of column C be recycled, at least half a column volume has been introduced; substantially unchanged feed appears in line 16, or the quantity of preferentially adsorbable fraction of the feed contained in the percolate effluent from column F rises above the desired maximum, or both; and substantially pure stripping liquid appears in line 18. When this condition is attained, the $n+2$ cycle is begun. In like manner the $n+2$, $n+3$, etc. cycles are carried out, the time of completion of each cycle being determined as described in the above descriptions of the $n$ and $n+1$ cycles.

Comparing Figures 5 and 6, representing two successive cycles of operation, it may be seen that the second of the two cycles illustrated by Figure 6 is initiated by regrouping the adsorbent masses to constitute adsorption and regeneration zones for the new cycle in such manner that the column C, the first terminal adsorbent mass of the adsorption zone in the $n$th cycle of Figure 5, becomes the last terminal adsorbent mass of the regeneration zone in the $n+1$ cycle of Figure 6; and column F, the first terminal adsorbent mass of the regeneration zone in the $n$th cycle of Figure 5, becomes the last terminal adsorbent mass of the adsorption zone in the $n+1$ cycle of Figure 6, the points of liquid inlet in each of the two zones in the $n$th cycle being at the same time shifted to the next serially connected adsorbent mass in the direction of flow of the same zone to initiate the $n+1$ cycle. Comparison of Figures 5 and 6 shows that the adsorbent masses are regrouped to initiate the new cycle, illustrated in Figure 6, in such manner that each adsorbent mass describes a relative motion countercurrent to the flow of liquid within its zone. For example, column E in Figure 6 is one adsorbent mass position closer to the adsorbate recycle inlet than it was in Figure 5; column H is in Figure 6 one adsorbent mass position closer to the stripping liquid inlet than it was in Figure 5. Thus, in a system of X-adsorbent masses, each adsorbent mass would move, relative to the liquid inlet points, one adsorbent mass position countercurrent to the flow of liquid upon initiation of each new cycle, and would return during the $X+1$ cycle of operation to the same relative position in the system which it occupied during the first cycle.

The general plan of the process being now disclosed, reference is made to Figure 5, in which the flow pattern of the $n$th cycle of operation of the last described modification of the process of this invention is illustrated, for the purpose of showing the manner in which this process embodies the most desirable features of both batch and continuous adsorption separation processes, and at the same time avoids the major difficulties inherent in each of them. First, it is pointed out that this process is not a mere multiplication of simple batch adsorption columns. At the beginning of the $n$th cycle of operation, columns F, G, H, and A contain in the interstitial spaces between the adsorbent particles a liquid including both strippant and adsorbate, the concentration of adsorbate in this interstitial liquid increasing progressively from F to A. The adsorbed material on the adsorbent in each of the columns is in dynamic equilibrium with the interstitial liquid, and likewise is in a concentration gradient increasing progressively from F to A. Consequently, as the $n$th cycle is begun, the fresh stripping liquid fed to column F comes into contact with adsorbent low in adsorbate content, effectively removing this small amount of adsorbate and completing the regeneration of the adsorbent; and, as this stripping liquid flows progressively through columns G, H, A, and B, it encounters adsorbent in which the adsorbate content is progressively higher. Thus, in this arrangement, substantially all of the advantage accruing to the countercurrent flow of a continuous process is obtained. This countercurrent type flow greatly increases stripping efficiency, the result being that recovery of adsorbate is effected by the use of a substantially smaller volume of stripping liquid than that which would be required for an equivalent recovery in a single batch column. The volume of stripping liquid adsorbate mixture which must be distilled, or otherwise treated to recover the adsorbate, is thus greatly decreased with corresponding decrease in the cost of the secondary recovery operation.

Further, in the present process, the adsorbent particles are in fixed beds, hence, the limitation upon the minimum particle size encountered in a continuous adsorption process does not apply, since the adsorbent particles used in this process may be as small as those which can be employed in a conventional batch process; and the advantage of rapid attainment of equilibrium is obtained and makes possible a higher rate of feed throughput than is possible where particle size is limited.

Referring again to the $n$th cycle of operation in the modification of the process illustrated by Figure 5 and described above, column C at the beginning of the $n$th cycle contains substantially feed mixture in the interstitial space, and the adsorbed material on the adsorbent is in dynamic equilibrium with this interstitial mixture. The adsorption is preferential, and the adsorption process is an equilibrium process; and the adsorbent in column C will hold adsorbed a quantity of the preferentially adsorbable fraction of the feed and a quantity of the non-preferentially adsorbable fraction of the feed. The ratio of preferentially adsorbable fraction to non-preferentially adsorbable fraction, however, will be much higher in the material held on the adsorbent than it is in the feed. If the adsorbent in column C were now treated with strippant, there would be recovered a mixture of strippant, percolate, and adsorbate. Only a degree of separation would be achieved. However, in the process of this invention, pursuant to its preferred embodiment, column C is not treated with strippant at this stage; instead, at the beginning of the $n$th cycle, previously separated adsorbate or the first effluent of the regeneration zone is recycled to column C. Since this adsorbate, or adsorbate rich effluent, is preferentially adsorbed, the effect of this recycling step is to remove from the adsorbent substantially all of the non-preferentially adsorbable material which had been adsorbed and to force it through line 14 into column D, the adsorbent in column C meantime becoming loaded to capacity with adsorbate. Then, at the beginning of the $n+1$ cycle in Figure 6 this recycled adsorbate is expelled from column C, together with the adsorbate held by the adsorbent at the beginning of the $n$th cycle. The net effect of this step of recycling adsorbate is the achievement of a sharper separation of the preferentially adsorbed fraction from the feed and of an increased yield of the percolate.

Figure 7 of the appended drawings illustrates the flow pattern in a further modification of the process of this invention. The modification here consists in employing a desorbent to remove the adsorbate from the adsorbent in a desorption zone and then removing the desorbent from the adsorbent in a regeneration zone. Columns D, E, and F are serially interconnected by lines 15 and 16, constituting an adsorption zone; columns G, H, A, and B are serially interconnected by lines 18, 19, and 12, constituting a regeneration zone; and column C constitutes a desorption zone. Previously recovered adsorbate is recycled to column D, feed is introduced into column E, and a percolate-stripping liquid mixture is withdrawn from column F. Stripping liquid is introduced into column G, and a stripping liquid-desorbent mixture is recovered from column B. A desorbent is introduced into column C and a desorbent-adsorbate mixture is recovered therefrom. Flow rates are so controlled that substantially simultaneously essentially pure adsorbate appears in line 15, unchanged feed appears in line 16, substantially pure stripping liquid appears in line 18, and substantially pure desorbent appears as the liquid effluent from column C. Upon the realization of these conditions, the next cycle of operation is initiated by moving every point at which liquid is introduced into or withdrawn from each column to the next adjacent column in the direction of flow in such a manner that column D becomes the desorption zone, columns E, F, and G constitute the adsorption zone, and columns H, A, B, and C constitute the regeneration zone.

In the modification illustrated in Figure 7, the step of recycling adsorbate may be omitted, in which case feed would be introduced into column D, and line 15 would be the only source from which liquid is introduced into column E, as illustrated by Figure 8 of the appended drawings. Also in the modifications illustrated by Figures 7 and 8, it may be desirable to use the percolate as the stripping liquid, which advantageously eliminates the need for separation of a percolate-stripping liquid mixture in secondary recovery.

Figure 9 of the appended drawings illustrates an arrangement of apparatus for the practice of the process of this invention. The letters A through H, inclusive, indicate columns filled with a mass of solid adsorbent particles. Lines 12 through 19, inclusive, controlled by valve 4 at each column, provide means for serially interconnecting the adsorption columns. Lines 7, 8, and 9 are header lines for feed, adsorbate and stripping liquid, respectively. Valve 1 at each column controls the flow of feed to the column; in like manner, valves 2 and 3 at each column control the flow of adsorbate and stripping liquid, respectively. A mixture of adsorbate and stripping liquid may be withdrawn from the appropriate column by opening valve 5 at that column, permitting the mixture to flow to a separation apparatus through line 10. Similarly, a percolate-stripping liquid mixture may be withdrawn and directed to separation via line 11 by opening valve 6 at the appropriate column. For example, the flow pattern of Figure 5 may be achieved with this apparatus by opening the following valves: valves 2 and 4 at column C, valves 1 and 4 at column D, valve 6 at column E, valves 3 and 4 at column F, valve 4 at columns G, H, and A, and valve 5 at column B. All other valves are closed. The valve adjustments necessary to produce the flow patterns of Figures 1, 2, 3, 4, or similar flow patterns, will be obvious to a person skilled in the art. If it is desired to use the flow pattern of Figure 7, a desorbent header line parallel to lines 7, 8, and 9 valved to each column is added, and a line to a desorbent-adsorbate separation apparatus is added paralleling lines 10 and 11 and valved to each column.

Each column is provided with a jacket 20 permitting heating or cooling of the columns individually. Valve 21 at each column is a steam inlet valve controlling the flow of steam to the column jackets, valve 22 at each column is a steam outlet valve, and valve 25 at each column may be opened to permit the flow of the condensed steam from the jackets to the drain. Valves 23 and 24 are inlet and outlet valves, respectively, by which the flow of water or other liquid coolant through the column jackets may be controlled. Valve 26 at each column may be opened to vent the column jackets. Valve 27 at each column may be opened to withdraw samples or to measure pressure. Other arrangements for heating and cooling the columns may be used, such as internal coils or external heat exchangers.

The process of the invention is illustrated by the following examples, in which the apparatus employed conformed essentially to that shown in Figure 9 of the appended drawings.

EXAMPLE I

The adsorption columns were charged with 28–200 mesh silica gel having a bulk density of 47 pounds per cubic foot. The void space between the adsorbent particles amounted to 42% of the volume of each column, and the pore volume of the adsorbent amounted to 28% of the volume of each column. In the following Table I, the legend "gal./gal. (V+P)" indicates gallons of liquid introduced per gallon of void space plus pore space in the column.

The adsorption columns measured 0.172 foot in internal diameter and 10 feet in length.

During the run a straight run kerosene distillate having an API gravity of 39.9°, an aniline point of 132, an aromatic content of 22.5%, a cetane number of 42.5, and a boiling range 352–511° F. was charged to the adsorption zone.

The stripping liquid employed was isoctane.

The time for each cycle of operation was three hours.

The following Table I summarizes process information for the run. In the table the eight adsorption columns are indicated by the letters A to H, inclusive, and their grouping in the adsorption and regeneration zones in a typical cycle of operation is indicated.

Table I

| Column Designation | Adsorption Zone | | | Regeneration Zone | | | | | Total |
|---|---|---|---|---|---|---|---|---|---|
| | A | B | C | D | E | F | G | H | |
| Conditions: Temp. °F | 60 | 100 | ¹100 | 220 | 220 | 220 | 220 | ¹180 | |
| Pressure drop lb./ft | 1.0 | 4.0 | 4.0 | 1.2 | 1.2 | 1.2 | 1.2 | 1.2 | |
| Lbs. Adsorbent/gal. feed/cycle | 10.5 | 10.5 | 10.5 | 10.5 | 10.5 | 10.5 | 10.5 | 10.5 | 84 |
| Lbs. Adsorbent/gal. feed/hour | 31.5 | 31.5 | 31.5 | 31.5 | 31.5 | 31.5 | 31.5 | 31.5 | 252 |
| Streams In: Feed gal./cycle | | 1.03 | | | | | | | 1.03 |
| Feed gal./hour/sq. ft | | 14.8 | | | | | | | |
| Feed gal./lb. ads./cycle | | 0.095 | | | | | | | |
| Adsorbate Recycle gal./cyc | 0.98 | | | | | | | | 0.98 |
| Adsorbate Recycle gal./hr./ft.² | 14.0 | | | | | | | | |
| Adsorbate Recycle gal./gal. V+P | 0.85 | | | | | | | | |
| Strippant gal./cycle | | | | 3.17 | | | | | 3.17 |
| Strippant gal./hr./ft.² | | | | 45.3 | | | | | |
| Strippant gal./lb. Adsorbent | | | | 0.29 | | | | | |
| Strippant gal./gal. feed | | | | 3.07 | | | | | |
| Total Streams In, gal./cyc | 0.98 | 1.03 | | 3.17 | | | | | 5.18 |
| Streams Out: | | | | | | | | | |
| Percolate gal./cycle | | | 0.79 | | | | | | 0.79 |
| Adsorbate gal./cycle | | | | | | | | 1.22 | 1.22 |
| Strippant gal./cycle | | | 1.22 | | | | | 1.95 | 3.17 |
| Net Volume to Stills gal./cycle | | | 2.01 | | | | | 3.17 | 5.18 |
| Total gal. to Stills/gal. feed | | | | | | | | | 5.0 |

¹ Columns C and H are at about 180° F. and 100° F., respectively, at the beginning of the cycle and reach 100° F. and 180° F., respectively, at the end of the cycle.

Distillation of the material effluent from column C in the run as illustrated by the above cycle produced a percolate yield amounting to 77% of the kerosene charged having an aromatic content of less than 1%, an aniline point of 165° F. and an API gravity of 44.3, and a cetane number of 51.5.

Distillation of the effluent from column H during this cycle produced a net adsorbate yield amounting to 23% of the kerosene charged having an aromatic content above 90%, an aniline point of −40° F. and an API gravity of 22.4.

EXAMPLE II

The adsorbent, kerosene charge, stripping liquid, and cycle time were the same as those shown in Example I. Operation was varied during the cycle described in the following Table II by directing the first effluent of column C, comprising stripping liquid, into column D rather than to distillation, and by directing the first effluent from column H, comprising stripping liquid and adsorbate, into column A. By this method of operation, the total volume of liquid required to be distilled is substantially decreased. Data for this run are shown in the following Table II.

Table II

| Column Designation | Adsorption Zone | | | Regeneration Zone | | | | | Total |
|---|---|---|---|---|---|---|---|---|---|
| | A | B | C | D | E | F | G | H | |
| Conditions: Temp. ° F | 60 | 100 | ¹100 | 220 | 220 | 220 | 220 | ¹180 | |
| Pressure Drop lb./ft | 1.0 | 3.0 | 3.0 | 0.8 | 0.8 | 0.8 | 0.8 | 0.8 | |
| Lb. Adsorbent/gal. feed/cycle | 12 | 12 | 12 | 12 | 12 | 12 | 12 | 12 | 96 |
| Lb. Adsorbent/gal. feed per hour | 36 | 36 | 36 | 36 | 36 | 36 | 36 | 36 | 288 |
| Streams In: Feed gal./cyc | | 0.90 | | | | | | | 0.90 |
| Feed gal./hr./ft.² | | 13 | | | | | | | |
| Feed gal./lb. ads./ft.² | | 0.083 | | | | | | | |
| Col. H Effluent recycle gal./cycle | ²1.11 | | | | | | | | 1.11 |
| Col. H Effluent recycle gal./hr./ft.² | 15.9 | | | | | | | | |
| Col. H Effluent recycle gal./gal. V+P | 0.95 | | | | | | | | |
| Strippant gal./cycle | | | | 2.38 | | | | | 2.38 |
| Strippant gal./hr./ft.² | | | | 34 | | | | | |
| Strippant gal./lb. Ads | | | | 0.22 | | | | | |
| Strippant gal./gal. feed | | | | 2.64 | | | | | |
| Total Streams In, gal./cyc | 1.11 | 0.90 | | 2.38 | | | | | 4.39 |
| Streams Out: | | | | | | | | | |
| Percolate gal./cycle | | | 0.69 | | | | | | 0.69 |
| Adsorbate gal./cycle | | | | | | | | ³0.48 | 0.48 |
| Strippant gal./cycle | | | 1.32 | | | | | 1.90 | 3.22 |
| Total Streams Out, gal./cycle | | | 2.01 | | | | | 2.38 | 4.39 |
| Strippant by-passed Col. C to Col. D, gal. per cycle | | | 0.80 | | | | | | |
| Col. H Effluent by-passed Col. H to A, gal./cyc² | | | | | | | | ²1.11 | |
| Net Volume to Stills gal./cycle | | | 1.21 | | | | | 1.27 | 2.48 |
| Total Gal. to Stills/gal. feed | | | | | | | | | 2.76 |

¹ Col. C and H are at about 180° F. and 100° F., respectively, at the beginning of the cycle and reach 100° F. and 180° F., respectively, at the end of the cycle.
² This material was the first effluent in the cycle from col. H and comprised adsorbate and stripping liquid.
³ 0.21 gal./cycle is product recovered by distillation. Remainder recycled.

Distillation of the net effluents of columns C and H resulted, respectively, in the production of percolate amounting to 77% of the volume of kerosene charged having an aromatic content below 1%, an aniline point of 165° F., an API gravity of 44.6, and a cetane number of 51.2; and of an adsorbate amounting to 23% of the volume of the kerosene charged and having an aromatic content above 90%, an aniline point of −35° F., and an API gravity of 23.2.

EXAMPLE III

The adsorption columns were charged with 28–200 mesh silica gel having a bulk density of 42 pounds per cubic foot. The void space between the adsorbent particles amounted to 40% of the volume of each column, and the pore volume of the adsorbent amounted to 27% of the volume of each column.

The adsorption columns measured 0.172 foot in internal diameter and 10 feet in length.

During this run, a catalytically reformed gasoline was charged. Inspection of this charge showed an API gravity of 50.9, aniline point 68.5, gromine number 3, an aromatic content of 35.8, sulfur content below 0.01%, refractive index 1.4356, and boiling range as determined by ASTM D-86 distillation of 134-310. The strippant was a heart cut of dearomatized kerosene having a boiling range 387-466° on a D-86 distillation.

The time for each cycle of operation was two hours. The following Table III shows significant data for the run.

F., an API gravity of 62.5, and bromine number of less than one.

Distillation of the effluent from column H resulted in the production of an adsorbate fraction amounting to 37% of the charge and having an aromatic content of 95%, an aniline point of −74° F., an API gravity of 32.5, and a bromine number between 3 and 4.

EXAMPLE IV

During this run the charge, stripping liquid, and adsorbent, as well as the flow pattern, were the same as those in Example III.

Operation differed from that in Example III in that a portion of the effluent from column H by-passed the stills and was introduced into col-

*Table III*

| Column Designation | Adsorption Zone | | | | Stripping Zone | | | | Total |
|---|---|---|---|---|---|---|---|---|---|
| | A | B | C | D | E | F | G | H | |
| Conditions: Temp. °F | 70 | 70 | 100 | ¹100 | 220 | 220 | 220 | ¹180 | |
| Pressure Drop, lb./ft | 0.05 | 0.05 | 0.5 | 0.7 | 0.7 | 0.7 | 0.7 | 0.7 | |
| Lb. Ads/gal feed/cycle | 18.5 | 18.5 | 18.5 | 18.5 | 18.5 | 18.5 | 18.5 | 18.5 | 148 |
| Lb. Ads/gal. feed/hr | 37 | 37 | 37 | 37 | 37 | 37 | 37 | 37 | 296 |
| Streams In: Feed gal./cycle | | | 0.528 | | | | | | 0.528 |
| Feed gal./hr./ft² | | | (22.7) | | | | | | |
| Feed gal./lb. Ads./cycle | | | 0.054 | | | | | | |
| Adsorbate Recycle gal./cyc. | 1.06 | | | | | | | | 1.06 |
| Adsorbate Recycle gal./hr./ft² | 22.7 | | | | | | | | |
| Adsorbate Recycle gal./gal. V + P | 0.94 | | | | | | | | |
| Strippant gal./cycle | | | 0.528 | | 2.38 | | | | 2.91 |
| Strippant gal./hr./ft² | | | (22.7) | | 51.0 | | | | |
| Strippant gal./lb. Ads | | | 0.054 | | 0.24 | | | | (0.29) |
| Strippant gal./gal. feed | | | 1.0 | | 4.5 | | | | (5.5) |
| Total Streams In, gal./cycle | 1.06 | | 1.06 | | 2.38 | | | | 4.5 |
| Streams Out: | | | | | | | | | |
| Percolate gal./cycle | | | | 0.33 | | | | | 0.33 |
| Adsorbate gal./cycle | | | | | | | | 1.26 | 1.26 |
| Strippant gal./cycle | | | | 1.79 | | | | 1.12 | 2.91 |
| Total Streams Out, gal./cycle | | | | 2.12 | | | | 2.38 | 4.50 |
| Strippant by-passed Col. D to Col. E, gal./cycle | | | | 0.80 | | | | | |
| Net Volume to Stills, gal./cyc | | | | 1.32 | | | | 2.38 | 3.70 |
| Total Gal. to Stills/gal. Feed | | | | | | | | | 7.0 |

¹ Columns D and H were about 180° F. and 100° F., respectively, at the beginning of the cycle and attained the tabulated temperature at the end of the cycle.

Distillation of the net effluent of column D resulted in the production of a percolate fraction amounting to 63% of the charge and having an aromatic content of 2%, an aniline point of 133° F., umn A as a recycle stream instead of recycling previously separated adsorbate as in Example III. The time for each cycle of operation was one hour in this run.

*Table IV*

| Column Designation | Adsorption Zone | | | | | | Regeneration Zone | | Total |
|---|---|---|---|---|---|---|---|---|---|
| | A | B | C | D | E | F | G | H | |
| Conditions: Temp. °F | 70 | 70 | 70 | 70 | 100 | ¹100 | 220 | ¹180 | |
| Pressure Drop lb./ft | 0.8 | 0.8 | 2.2 | 2.2 | 2.0 | 2.0 | 2.0 | 2.0 | |
| Lb./Ads./gal. feed/cycle | 18.5 | 18.5 | 18.5 | 18.5 | 18.5 | 18.5 | 18.5 | 18.5 | 148 |
| Lb. Ads./gal. feed/hr | 18.5 | 18.5 | 18.5 | 18.5 | 18.5 | 18.5 | 18.5 | 18.5 | 148 |
| Streams In: Feed gal./cyc | | | | | 0.53 | | | | 0.53 |
| Feed gal./hr | | | | | 22.7 | | | | |
| Feed gal./lb. Ads./cycle | | | | | 0.054 | | | | |
| Col. H Effluent Recycle gal./cycle | ²1.44 | | | | | | | | 1.14 |
| Col. H Effluent Recycle gal./hr./ft² | 48.7 | | | | | | | | |
| Col. H Effluent Recycle gal./gal. V + P | 1.03 | | | | | | | | |
| Strippant gal./cycle | | | | | | | 2.38 | | 2.38 |
| Strippant gal./hr./ft² | | | | | | | 102 | | |
| Strippant gal./lb. ads | | | | | | | 0.24 | | |
| Strippant gal./gal. feed | | | | | | | 4.5 | | |
| Total Streams In: gal./cyc | 1.14 | | | | 0.53 | | 2.38 | | 4.05 |
| Streams Out: | | | | | | | | | |
| Percolate, gal./cyc | | | | | | 0.34 | | | 0.34 |
| Adsorbate, gal./cycle | | | | | | | | ³0.68 | 0.68 |
| Strippant, gal./cycle | | | | | | 1.33 | | 1.70 | 3.03 |
| Total Streams Out, gal./cyc | | | | | | 1.67 | | 2.38 | 4.05 |
| Strippant by-passed Col. F to Col. G, gal./cycle | | | | | | 0.80 | | | 0.80 |
| Col. H Effluent by-passed Col. H to A, gal./cycle | (²) | | | | | | | ²1.14 | 1.14 |
| Net Volume to Stills, gal./cycle | | | | | | 0.87 | | 1.24 | 2.11 |

¹ Columns F and H are about 180° F. and 100° F., respectively, at the beginning of the cycle and reach the tabulated value at the end of the cycle.
² This material was the first effluent from column H during the cycle and was comprised of adsorbate and stripping liquid.
³ 0.19 gal./cycle is product recovered by distillation. Remainder recycled.

Distillation of the net effluents from columns D and H produced a highly paraffinic percolate fraction amounting to 65% of the charge by volume and a highly aromatic adsorbate amounting to 35% of the charge by volume, respectively. The percolate contained less than 1% aromatics and had a bromine number of 4. The adsorbate had an aromatic content of 99% and a bromine number of less than 1.

Comparison was made between an ordinary batch operation and cyclic operation according to the process of the invention. In the batch operation, two adsorption columns were employed, one being on stream while the other was being regenerated. The kerosene distillate of Example I was treated by both methods, employing adsorbate recycle in each and using isooctane in each as the stripping liquid. Comparison was made on the basis that equal yields of equal quality are produced at equal rates by the two methods. It was found that cyclic operation according to the process of the present invention had two important advantages over batch operation. First, the adsorbent inventory requirement for cyclic operation, employing three columns in the adsorption zone and five in the stripping zone, was found to be only 0.57 of that for batch operation. Second, the stripping liquid requirement in this cyclic operation amounted to only 0.21 of that for the batch operation. In cyclic operation, 3.2 gallons of stripping liquid were required to remove the adsorbate from the adsorbent and concurrently regenerate it for each gallon of percolate produced. In batch operation, the corresponding figure is 15.1 gallons of stripping liquid per gallon of percolate produced.

Cyclic operation thus presents two advantages of considerable economic significance. Lower adsorbent inventory means a lower initial outlay and lower replacement costs. The lower stripping liquid requirement means a substantial reduction in the volume of material requiring separation by distillation in secondary recovery operations.

The present invention in its preferred modification, as illustrated by Fig. 5, is a process which will effectively separate any liquid mixture which is amenable to separation by preferential adsorption. A plurality of solid adsorbent masses are utilized in the process, one group of them being maintained in serial interconnection constituting an adsorption zone and the remainder being grouped in serial interconnection, constituting a regeneration zone. Feed is introduced into the adsorption zone and is there separated into an adsorbate held by the adsorbent and a percolate, which is recovered from the liquid effluent from the adsorption zone. The flow of feed is continuned until the adsorbent in at least one of the adsorbent masses constituting the adsorption zone is spent, at which time the feed introduction point is moved to the next serially connected adsorbent mass in the direction of flow, and the spent mass is connected to the regeneration zone as the last mass thereof. Meantime, a stripping liquid is introduced into the first adsorbent mass of the regeneration zone, and a mixture of stripping liquid and adsorbate is recovered from the last adsorbent mass thereof. When the stripping of the first mass of the regeneration zone is substantially complete, the stripping liquid introduction point is moved to the next serially connected adsorbent mass in the direction of flow, and the stripped mass is connected to the adsorption zone as the last mass thereof. The flow rates are so maintained that the movement of the feed introduction point and the stripping liquid introduction point may be made simultaneously. The process may be modified by recycling a portion of the adsorbate to the first adsorbent mass of the adsorption zone or by setting up a desorption zone in addition to the adsorption and regeneration zones as disclosed above.

A preferred adsorbent material is silica gel; however, alumina, magnesia, activated charcoal, and various silica-alumina gel mixtures may be successfully employed in the process. The adsorbent particles may be as small as desired, provided that they may be maintained in the adsorption columns by filters, screens or other means, flow rates being maintained by increasing pressure.

While the process of this invention may be adapted to the separation of any liquid mixture amenable to separation by preferential adsorption, preferred feeds are kerosene distillate, diesel fuel stock, lubricating oils suitably diluted, aromatic-paraffinic mixtures, olefinic-paraffinic mixtures, and the like. Treatment by the process of this invention effects de-aromatization of diesel fuels, de-aromatization and desulfurization of kerosene distillate, de-aromatization of lubricating stocks, and fractionation of aromatic-paraffinic or olefinic-paraffinic, or like mixtures. An organic liquid mixture containing oxygenated compounds and hydrocarbons such as the reaction product of the Fischer-Tropsch or Oxo process may be separated by the cyclic process of this invention employing the stripping and regeneration technique disclosed in the copending application of Cope, Serial No. 777,972. When a lubricating oil is separated, the modification of the process illustrated in Figure 8 is preferably employed. The lubricating oil is preferably diluted with a saturated hydrocarbon containing 3 to 6 carbon atoms, and the hydrocarbon employed as a diluent is also employed as the stripping liquid in the process.

The stripping liquids used in this process and the quantity required in each cycle will vary with the type of feed stock being treated and the degree of separation desired. The stripping liquid chosen in each case should have a high diffusion coefficient and should be readily separable from both the adsorbate and from the percolate in secondary recovery operations; it is also desirable that the stripping liquid and adsorbate be mutually soluble. In the event that a desorbent is used in the process, as described in reference to Figures 7 and 8, the percolate may be used as a strippant.

The quantity of adsorbate recycled will vary according to the composition of the feed stock and the degree of separation desired to be effected.

The number of adsorption columns employed in each zone may be varied. The larger the number of adsorbent masses, the closer the approach to true countercurrent operation. The maximum number would be dictated by considerations of economy. The adsorption columns are so connected that any desired column or columns may be eliminated from the flow pattern by changing the line connections. This may be done for the purpose of repair, severe regeneration of adsorbent, or process control.

The secondary recovery separations of adsorbate-stripping liquid, percolate-stripping liquid, desorbent-stripping liquid, and desorbent-adsorbate mixtures which may be necessary in the present process and the indicated modifications thereof may be effected ordinarily by distillation; however, any conventional separatory process may be employed.

Temperature and pressure may be varied as desired to increase the efficiency of the process. Since the rates at which the several equilibria involved in the process are attained increase with temperature, it may be desirable to operate at an elevated temperature in some or all of the adsorbent masses in the system. Temperature in the individual adsorbent vessels may be controlled by circulating steam or a coolant through a jacketed exterior zone, or by preheating or precooling the liquid being introduced into the individual adsorbent masses. Feed stocks of high viscosity may be diluted prior to treatment in order to lower viscosity and increase diffusivity.

Provision may be made to take side cuts from some of the adsorbent masses with a view to decreasing the volume of liquid required to be handled in secondary recovery operations.

While the flow patterns described above for use in this process and the indicated modifications thereof are adequate for the separatory treatment of most feed mixtures, it is obvious that various changes can be made in the flow patterns and also in the operating conditions without departure from the scope of the appended claims.

We claim:

1. In a process for the separation of liquid petroleum stocks amenable to separation by preferential adsorption of one fraction of the stock on a solid adsorbent, the method which comprises utilizing in cyclic operation a plurality of units of fixed solid adsorbent masses disposed in at least two serially interconnected groups in each cycle, one group constituting a feed separation adsorption zone and the other a feed adsorbate stripping zone, concurrently in each cycle passing a liquid petroleum feed into one terminal adsorbent mass unit of the adsorption zone to separate an adsorbate comprised of the preferentially adsorbable fraction of the feed and withdrawing from the other terminal adsorbent mass of the adsorption zone a liquid composed of the residual non-preferentially adsorbable fraction of the feed until adsorption is complete in the feed inlet terminal mass, and passing into one terminal adsorbent mass of the stripping zone a stripping liquid to remove from the adsorbent the adsorbate separated in previous cycles of operation, thereby regenerating the adsorbent for re-use and withdrawing from the other terminal adsorbent mass of the regeneration zone a mixture comprised of the stripping liquid and the adsorbate until stripping is complete in the inlet terminal mass, initiating successive cycles of operation by moving all points of liquid introduction and withdrawal in the several adsorbent masses of each zone to the next serially connected adsorbent mass in the direction of flow in such zone and connecting the inlet terminal adsorbent mass of each zone, into which liquid is introduced in one cycle and the operation therein completed to the other zone to constitute the terminal adsorbent mass from which liquid is withdrawn in the succeeding cycle.

2. In a process for the separation of liquid mixtures amendable to separation by the preferential adsorption of one fraction of the mixture, the improved cyclic method which comprises in each cycle providing a plurality of units of solid adsorbent masses in two serially interconnected groups, one group of units constituting a feed separation adsorption zone and the other a feed adsorbate strippant zone, concurrently in each cycle introducing into a liquid inlet disposed in one terminal adsorbent mass of the adsorption zone a feed mixture to separate in said zone an adsorbate comprised of the preferentially adsorbable fraction of the feed until adsorption is complete in the feed inlet terminal mass, and passing into a liquid inlet disposed in one terminal adsorbent mass of the regeneration zone a stripping liquid to regenerate the adsorbent of said zone and remove the adsorbate separated in previous cycles of operation therefrom until stripping is complete in the inlet terminal mass, removing from a liquid outlet disposed in the other terminal arsorbent mass of the adsorption zone a liquid comprised of the residual non-adsorbed fraction of the feed and stripping liquid resident in said zone at the termination of the preceding cycle, removing from a liquid outlet disposed in the other terminal adsorbent mass of the stripping zone a liquid comprised of stripping liquid and adsorbate, initiating successive cycles of operation by moving all points of liquid introduction in the several adsorbent masses of each zone to the next serially connected adsorbent mass in the direction of flow in such zone and connecting the inlet terminal adsorbent mass of each zone in one cycle of operation to the other zone to constitute the outlet terminal adsorbent mass thereof in which the operation is complete at the end of the next succeeding cycle of operation.

3. The method as described in claim 2, wherein the liquid feed mixture is a petroleum naphtha.

4. The method as described in claim 2, wherein the liquid feed mixture is a kerosene distillate.

5. The method as described in claim 2, wherein the liquid feed mixture is catalytically reformed naphtha.

6. In a process for the separation of liquid mixtures amenable to separation by preferential adsorption of a fraction of the mixture on a solid adsorbent the improved cyclic method, which comprises in each cycle (1) percolating a liquid feed through one group of serially interconnected solid adsorbent mass units constituting a feed separation adsorption zone to separate an adsorbate comprised of the preferentially adsorbable fraction of the feed and a percolate comprised of the residual non-adsorbed fraction of the feed, and (2) passing a stripping liquid through another group of serially interconnected adsorbent mass units constituting a regeneration zone to remove from the adsorbent the adsorbate laid down in previous cycles of operation and to regenerate the adsorbent, simultaneously continuing the flow of the process liquids through said zones until the respective operations occurring in the inlet terminal mass units are complete, and conducting successive cycles of operation by successively regrouping the adsorbent mass units comprised in said zones by altering the liquid flow interconnections therebetween and the points of liquid introduction to and withdrawal from said units in a manner adapted to cause each of the adsorbent mass units to progress by relative motion countercurrent to the flow of liquid through the zone in which it is initially disposed and through the other zones at a rate of one adsorbent mass unit position per cycle away from its position relative to the liquid outlet of the zone in which it is disposed and to return, in a system of $x$ adsorbent mass units, during the $X+1$ cycle to its initial relative position.

7. In an adsorption separation process wherein a liquid feed mixture amenable to separation by preferential adsorption is separated by contact with a solid adsorbent into an adsorbate comprised of the preferentially adsorbable fraction of the feed and a percolate comprised of the residual non-preferentially adsorbable fraction of the feed, the improved cyclic method which comprises maintaining in each cycle a feed separation adsorption zone consisting of a group of serially interconnected solid adsorbent masses a gradient concentration of adsorbate on the several adsorbent masses which decreases in the direction of feed flow within said zone, said feed being introduced into the first and a percolate being withdrawn from the last adsorbent mass of said zone; maintaining in a regeneration zone consisting of another group of serially interconnected solid adsorbent masses a gradient concentration of adsorbate on the several adsorbent masses which increases in the direction of stripping liquid flow in said zone, said stripping liquid being introduced into the first and a mixture of stripping liquid and adsorbate being withdrawn from the last adsorbent mass of said zone; continuing the described flow of feed and stripping liquid until the concentration of the adsorbate on the first adsorbent mass in the adsorption zone and on the first adsorbent mass in the regeneration zone reaches a substantially constant value; thereupon initiating each succeeding cycle of operation by regrouping the adsorbent masses in such manner that the first adsorbent masses of the adsorption zone and of the regeneration zone become, respectively, the last adsorbent masses of the regeneration zone and the adsorption zone and moving the points of introduction of the feed and stripping liquid to the next serially connected adsorbent mass in the direction of flow in their respective zones of introduction.

8. In an adsorption separation process wherein a liquid feed mixture amenable to separation by preferential adsorption is separated by contact with a solid adsorbent into an adsorbate comprised of the preferentially adsorbable fraction of the feed and a percolate comprised of the non-preferentially adsorbable fraction of the feed, the improved cyclic method which comprises in each cycle maintaining a group of serially interconnected solid adsorbent masses constituting a feed separation adsorption zone, recycling to a liquid inlet situated in one terminal adsorbent mass of said zone previously separated adsorbate, introducing into a liquid inlet situated in an intermediate adsorbent mass of said zone a liquid feed, and recovering at a liquid outlet situated in the other terminal adsorbent mass of said zone a percolate; maintaining in the same cycle another group of serially connected adsorbent masses constituting a regeneration zone, introducing a stripping liquid into a liquid inlet situated in one terminal adsorbent mass of the regeneration zone and recovering a mixture of stripping liquid and adsorbate at a liquid outlet situated in the other terminal adsorbent mass of the regeneration zone; continuing the flow of the process liquids until the respective operations occurring in said inlet and intermediate units are complete, and initiating each successive cycle of operation by regrouping the adsorbent masses in such manner that the inlet terminal adsorbent masses of the adsorption zone and regeneration zone in one cycle become, respectively, the outlet terminal adsorbent masses of the regeneration zone and adsorption zone in the next succeeding cycle and by moving all liquid inlet points in each zone to the next serially connected adsorbent mass in the direction of flow.

9. The process as defined in claim 6, wherein the liquid feed is a petroleum naphtha.

10. The process as defined in claim 6, wherein the liquid feed is a catalytically reformed naphtha.

11. The process as defined in claim 6, wherein the liquid feed is a gas-oil fraction, and wherein the percolate fraction of said feed has a cetane number substantially higher than the original gas-oil fraction.

12. The process as defined in claim 6, wherein the liquid feed is a kerosene distillate.

13. In an adsorption separation process wherein a liquid feed mixture is separated by contact with a solid adsorbent into an adsorbate comprised of the preferentially adsorbable fraction of the feed and a percolate comprised of the non-preferentially adsorbable fraction of the feed, the improved cyclic method which comprises maintaining a group of solid adsorbent masses in serial interconnection constituting a desorption zone, passing a desorbing liquid for which the adsorbent shows a greater adsorptive preference than that shown for the adsorbate into one terminal adsorbent mass of the desorption zone and recovering a mixture of desorbing liquid and adsorbate from the other terminal adsorbent mass of the desorption zone; maintaining another group of serially interconnected adsorbent masses constituting an adsorption zone, passing previously recovered adsorbate into the first terminal adsorbent mass of the adsorption zone and a liquid feed into an intermediate adsorbent mass of said zone and recovering from the last adsorbent mass of said zone a liquid comprised of the percolate fraction of said feed; maintaining another group of solid adsorbent masses in serial interconnection constituting a regeneration zone, passing into the first terminal adsorbent mass of the regeneration zone a stripping liquid and recovering from the last terminal adsorbent mass of said zone a mixture of stripping liquid and desorbing liquid; and initiating each successive cycle of operating by altering the interconnection of the several adsorbent masses to regroup them in a manner adapted to cause each of the adsorbent masses to progress by relative motion countercurrent to the flow of liquid through the zone in which it is situated, and then through the other zones at a rate of one adsorbent mass position per cycle and to return, in a system of $X$ adsorbent masses, during the $X+1$ cycle to its relative position in the first cycle, said relative motion being such that the adsorbent masses move from the adsorption zone to the desorption zone to the regeneration zone and then back to the adsorption zone.

14. The method as described in Claim 7, wherein the desorption zone consists of one adsorbent mass.

15. In a process for the separation of liquid feed mixtures by contact with a solid adsorbent into an adsorbate comprised of the preferentially adsorbable fraction of the feed and a percolate comprised of the non-preferentially adsorbable fraction of the feed, the improved cyclic method which comprises maintaining in each cycle an adsorption zone, a desorption zone, and a regeneration zone, each zone consisting of a group of serially interconnected solid adsorbent masses, the first terminal adsorbent mass of each zone having a liquid inlet and the last terminal adsorbent mass of each zone having a liquid outlet, passing a feed into the inlet of the adsorption zone and recovering a percolate at its outlet, passing a desorbing liquid into the inlet of the desorption zone and recovering a mixture of desorbing liquid and adsorbate at its outlet, passing a stripping liquid into the inlet of the regeneration zone and recovering a mixture of stripping liquid and desorbing liquid at its outlet, and initiating each successive cycle of operation by moving the liquid inlet of each zone to the next serially connected adsorbent mass of the zone, and regrouping the several adsorbent masses in such manner that the first terminal adsorbent masses of the adsorption zone, the desorption zone and the regeneration zone in one cycle of operation become, respectively, the last terminal adsorbent masses of the desorption zone, the regeneration zone, and the adsorption zone in the next succeeding cycle.

16. The method as described in claim 15, wherein the liquid feed is a heavy gas-oil fraction.

17. In a process for the separation of liquid feed mixtures by contact with a solid adsorbent into an adsorbate comprised of the preferentially adsorbable fraction of the feed and a percolate comprised of the non-preferentially adsorbable fraction of the feed, the improved cyclic method which comprises maintaining in each cycle an adsorption zone, a desorption zone, and a regenerating zone, each zone consisting of a group of serially interconnected adsorbent masses, passing through the adsorption zone a feed liquid to separate the adsorbate and recover the effluent percolate, passing through the desorption zone a desorbing liquid and recovering therefrom a mixture of desorbing liquid and adsorbate, and passing through the regeneration zone a mixture of stripping liquid and desorbing liquid; and initiating successive cycles of operation by regrouping the several adsorbent masses to start each new cycle in a manner adapted to cause each adsorbent mass to describe a relative motion countercurrent to the flow of liquid such that each adsorbent mass progresses countercurrently through the zone in which it is situated in the first cycle and then countercurrently through each of the other zones, returning in a system of $X$ adsorbent masses during the $X+1$ cycle to its relative position in the first cycle, said relative motion being such that the adsorbent masses move from the adsorption zone to the desorption zone to the regeneration zone and back to the adsorption zone.

18. The method as described in claim 17, wherein the liquid feed is a petroleum lubricating oil admixed with a light hydrocarbon diluent.

19. The method as described in claim 17, wherein the liquid feed is a petroleum lubricating oil admixed with a light hydrocarbon diluent, and wherein said light hydrocarbon diluent is employed as the stripping liquid.

20. The method as defined in claim 17, wherein the liquid feed is an organic liquid mixture comprising oxygenated organic compounds and hydrocarbons.

21. The method as defined in claim 2, wherein the feed mixture is introduced into the adsorption zone at a rate sufficient to establish in the interstitial liquid in said zone a gradient concentration of unseparated adsorbate which decreases in the direction of flow and which extends through at least two adsorbent masses of said zone.

22. In an adsorption separation process wherein a liquid feed mixture amenable to separation by selective adsorption is separated by contact with a solid adsorbent into an adsorbate and a percolate comprised of the residual non-preferentially adsorbable fraction of the feed, the improved cyclic method which comprises in each cycle the stage (1) of introducing a liquid feed into the first of a group of not less than three serially interconnected solid adsorbent masses constituting a feed separation adsorption zone to separate an adsorbate comprised of the preferentially adsorbable components of the feed and to establish in the interstitial liquid in the adsorption zone a gradient concentration of adsorbate which decreases in the direction of feed flow within the zone and which extends through at least two of the adsorbent masses of said zone, withdrawing a percolate from the last adsorbent mass of said zone in the direction of flow, any stage (2) of introducing a liquid into the first of another group of serially interconnected solid adsorbent masses constituting a regeneration zone to remove previously separated adsorbate from the adsorbent in said zone and withdrawing a mixture of adsorbate and said liquid from the last mass of said zone in the direction of flow, continuing the described flow of feed and liquid until the concentration of adsorbate in the interstitial liquid of the first or feed inlet adsorbent mass of the adsorption zone is substantially equal to its concentration in the feed and until the adsorbate has been substantially completely removed from the first adsorbent mass of the regeneration zone; thereupon initiating each succeeding cycle of operation by regrouping the adsorbent masses in such manner that the first adsorbent masses of the adsorption zone and of the regeneration zone become, respectively, the last adsorbent masses of the regeneration zone and the adsorption zone and moving the points of introduction of the feed and liquid to the next serially connected adsorbent mass in the direction of flow in their respective zones of introduction.

CLARK J. EGAN.
JOHN W. SCOTT.

REFERENCES CITED

The following references are of record in the file of this patent:

UNITED STATES PATENTS

| Number | Name | Date |
|---|---|---|
| 2,395,491 | Mavity | Feb. 26, 1946 |
| 2,398,101 | Lipkin | Apr. 9, 1946 |
| 2,410,642 | Farkas et al. | Nov. 5, 1946 |
| 2,415,315 | Walter et al. | Feb. 4, 1947 |
| 2,441,572 | Hirschler et al. | May 18, 1948 |
| 2,470,339 | Claussen et al. | May 17, 1949 |

FOREIGN PATENTS

| Number | Country | Date |
|---|---|---|
| 109,077 | Great Britain | Feb. 4, 1947 |